(12) United States Patent
Fukaya et al.

(10) Patent No.: US 8,636,126 B2
(45) Date of Patent: Jan. 28, 2014

(54) HYDRAULIC CLUTCH

(75) Inventors: Kazuyuki Fukaya, Saitama (JP); Kosaku Takahashi, Saitama (JP); Junya Watanabe, Saitama (JP); Dai Arai, Saitama (JP); Masataka Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 13/036,697

(22) Filed: Feb. 28, 2011

(65) Prior Publication Data
US 2011/0214959 A1  Sep. 8, 2011

(30) Foreign Application Priority Data
Mar. 3, 2010 (JP) ................. 2010-046930

(51) Int. Cl.
  *F16D 25/0638* (2006.01)
  *F16D 25/10* (2006.01)
(52) U.S. Cl.
  USPC ........... 192/48.611; 192/70.12; 192/85.39; 192/85.25; 192/85.61; 192/106 F
(58) Field of Classification Search
  USPC ........... 192/48.611, 48.614, 70.12, 85.25, 192/85.39, 85.61, 106 F, 113.35
  See application file for complete search history.

(56) References Cited

U.S. PATENT DOCUMENTS

| | | | |
|---|---|---|---|
| 3,823,802 A | 7/1974 | Winzeler et al. | |
| 5,495,927 A * | 3/1996 | Samie et al. | 192/70.12 |
| 6,035,989 A * | 3/2000 | Matsuoka | 192/85.32 |
| 6,991,078 B2 * | 1/2006 | Leber | 192/3.27 |
| 2010/0072018 A1 * | 3/2010 | Tsukada et al. | 192/48.611 |

FOREIGN PATENT DOCUMENTS

| | | | |
|---|---|---|---|
| EP | 0 762 004 A2 | 3/1997 | |
| EP | 1 288 517 A1 | 3/2003 | |
| JP | 02120517 | * 5/1990 | 192/113.35 |
| JP | 2008-089066 A | 4/2008 | |
| JP | 2 068 029 A1 | 6/2009 | |

* cited by examiner

*Primary Examiner* — David D Le
*Assistant Examiner* — Huan Le
(74) *Attorney, Agent, or Firm* — Birch, Stewart, Kolasch & Birch, LLP

(57) ABSTRACT

A hydraulic clutch for preventing a drag of a clutch at the time of disengaging the clutch by decreasing an oil supply quantity between a plurality of clutch plates and a plurality of clutch discs thus decreasing a change hitting sound at the time of shifting. A hydraulic clutch is configured such that the superposition between an oil supply hole formed in a clutch pressure plate and an oil supply hole formed in a clutch center becomes maximum when the clutch is engaged.

20 Claims, 9 Drawing Sheets

HYDRAULIC CLUTCH

CROSS-REFERENCE TO RELATED APPLICATIONS

The present application claims priority under 35 USC 119 to Japanese Patent Application No. 2010-046930 filed on Mar. 3, 2010 the entire contents of which are hereby incorporated by reference.

BACKGROUND OF THE INVENTION

1. Field of the Invention

The present invention relates to a hydraulic clutch, and more particularly to a hydraulic clutch used in a twin-clutch type transmission.

2. Description of Background Art

A hydraulic clutch is known wherein a twin clutch includes first and second hydraulic clutches each of which exhibits a predetermined engaging force by displacing two pressure plates in the axial direction due to oil pressure supplied from the outside. The hydraulic clutches are coaxially arranged adjacent to each other. See, for example, JP-A-2008-89066.

In the hydraulic clutch described in the above-mentioned JP-A-2008-89066, even when the clutch is disengaged, working oil inside of a disengagement-side oil pressure chamber is supplied between a plurality of clutch plates and a plurality of clutch discs from an oil supply hole formed in a clutch center. Accordingly, an oil supply quantity becomes excessively large when the clutch is disengaged so that a drag torque is increased and a rotational speed of a main shaft is increased thus giving rise to a case where a change hitting sound at the time of shifting becomes large.

SUMMARY AND OBJECTS OF THE INVENTION

The present invention has been made in view of the above-mentioned circumstances. It is an object of an embodiment of the present invention to provide a hydraulic clutch which can prevent a drag of a clutch at the time of disengaging the clutch by decreasing an oil supply quantity between a plurality of clutch plates and a plurality of clutch discs thus decreasing a change hitting sound at the time of shifting.

To achieve the above-mentioned object, according to an embodiment of the present invention a hydraulic clutch is provided in which a plurality of clutch discs and a plurality of clutch plates are provided between a clutch outer and a clutch center, and the engagement and disengagement of the clutch are performed by pushing the plurality of clutch discs and the plurality of clutch plates by a clutch pressure plate. An oil supply hole is formed in a portion of the clutch pressure plate and a portion of a guide portion of the clutch center which overlap with each other respectively. The superposition between the oil supply hole formed in the clutch pressure plate and the oil supply hole formed in the clutch center becomes maximum when the clutch is engaged.

According to an embodiment of the present invention, the oil supply hole formed in the clutch center opens in a cancellation chamber formed in the inside of the clutch center.

According to an embodiment of the present invention, a cancellation hole for releasing an oil pressure in the cancellation chamber to the outside of the cancellation chamber is formed in the cancellation chamber in addition to the oil supply hole.

According to an embodiment of the present invention, the cancellation hole is closed by the clutch pressure plate when the clutch is engaged, and the cancellation hole is opened when the clutch is disengaged.

According to an embodiment of the present invention, the hydraulic clutch is used in a twin-clutch type transmission.

According to an embodiment of the present invention, the oil supply hole is formed in the portion of the clutch pressure plate and the portion of the guide portion of the clutch center which overlap with each other respectively, and the superposition between the oil supply hole formed in the clutch pressure plate and the oil supply hole formed in the clutch center becomes maximum when the clutch is engaged. Due to such a constitution, an oil supply quantity becomes is increased when the clutch is engaged and the oil supply quantity is decreased when the clutch is disengaged. Accordingly, a drag of the clutch can be prevented so that a change hitting sound at the time of shifting can be decreased.

According to an embodiment of the present invention, the oil supply hole formed in the clutch center opens in the cancellation chamber formed in the inside of the clutch center. Due to such a constitution, it is unnecessary to additionally provide an oil supply passage to the oil supply hole formed in the clutch center so that the oil supply passage can be simplified.

According to an embodiment of the present invention, the cancellation hole for releasing an oil pressure in the cancellation chamber to the outside of the cancellation chamber is formed in the cancellation chamber in addition to the oil supply hole. Due to such a constitution, it is possible to prevent the excessive elevation of an oil pressure in the cancellation chamber when the clutch is disengaged. Accordingly, an operation at the time of next clutch engagement can be carried out rapidly so that the response of the hydraulic clutch can be enhanced.

According to an embodiment of the present invention, the cancellation hole is closed by the clutch pressure plate when the clutch is engaged, and the cancellation hole is opened when the clutch is disengaged. Due to such a constitution, it is possible to elevate an oil pressure in the cancellation chamber when the clutch is engaged. Accordingly, an operation at the time of next clutch disengagement can be carried out rapidly so that the response of the hydraulic clutch can be enhanced.

According to an embodiment of the present invention, the hydraulic clutch is used in a twin-clutch type transmission. Accordingly, although a change hitting sound is liable to occur when a clutch is drawn at the time of changing a state of a clutch in the twin-clutch type transmission, the present invention can prevent the occurrence of such a hitting sound.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
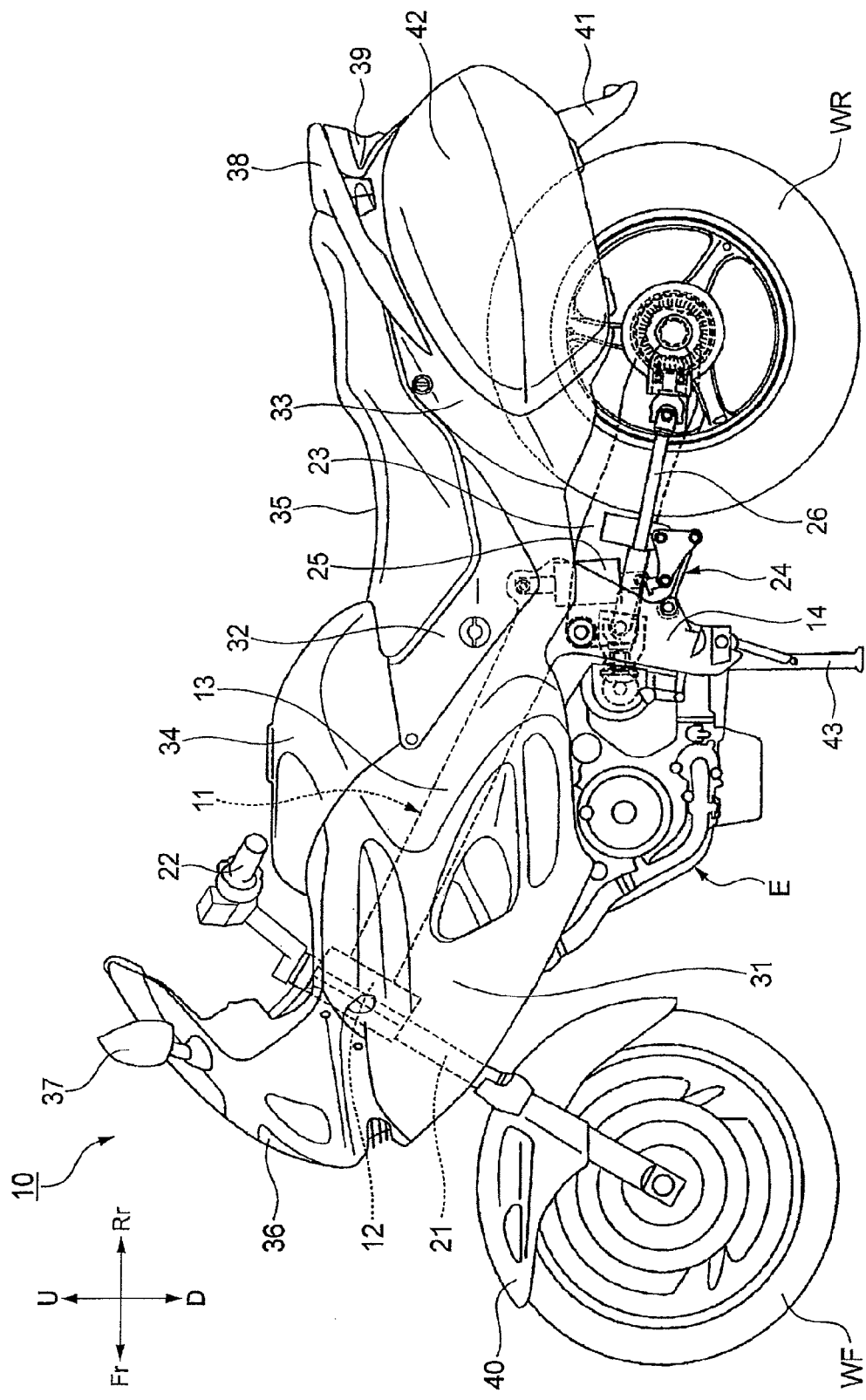
FIG. 1 is a left side view for explaining a motorcycle on which a hydraulic clutch according to one embodiment of the present invention is mounted.

Hereinafter, one embodiment of a hydraulic clutch according to the present invention is explained in detail in conjunction with drawings. Here, the drawings are viewed in the direction of the symbols. In the explanation made hereinafter, directions of front and rear, left and right, and up and down are determined in accordance with the directions as viewed from a rider. The frontward direction of a vehicle is indicated by symbol Fr, the rearward direction of the vehicle is indicated by symbol Rr, the leftward direction of the vehicle is indicated by symbol L, the rightward direction of the vehicle is indicated by symbol R, the upward direction of the vehicle is indicated by symbol U, and the downward direction of the vehicle is indicated by symbol D in the drawings.

As shown in FIG. 1, a vehicle body frame 11 of a motorcycle 10 includes a head pipe 12 which is arranged on a front end of the vehicle body frame 11 with a pair of left and right main frames 13 which extend in the rearward and downward direction from the head pipe 12. A pair of left and right pivot plates 14 is connected to rear portions of the pair of left and right main frames 13 and extend in the downward direction.

Further, the motorcycle 10 includes a front fork 21 which is steerably supported on the head pipe 12 with a front wheel WF which is rotatably supported on a lower end portion of the front fork 21. A steering handle 22 is mounted on an upper end portion of the front fork 21 with a swing arm 23 swingably supported on the pivot plate 14. A rear wheel WR is rotatably supported on a rear end portion of the swing arm 23 with a link 24 provided between a lower portion of the pivot plate 14 and a front portion of the swing arm 23. A shock absorber 25 is provided between an upper portion of the pivot plate 14 and the link 24.

In FIG. 1, a front cowl 31 is provided together with a side cowl 32, a rear cowl 33, a fuel tank 34, a seat 35, a headlight 36, a side mirror 37, a rear grip 38, a tail light 39, a front fender 40, a rear fender 41, a side back 42, and a side stand 43.

Further, an engine E is suspended from the main frames 13 and the pivot plates 14, and rotational power outputted from the engine E is transmitted to the rear wheel WR by way of a drive shaft 26 which extends in the longitudinal direction.

Figure 2:
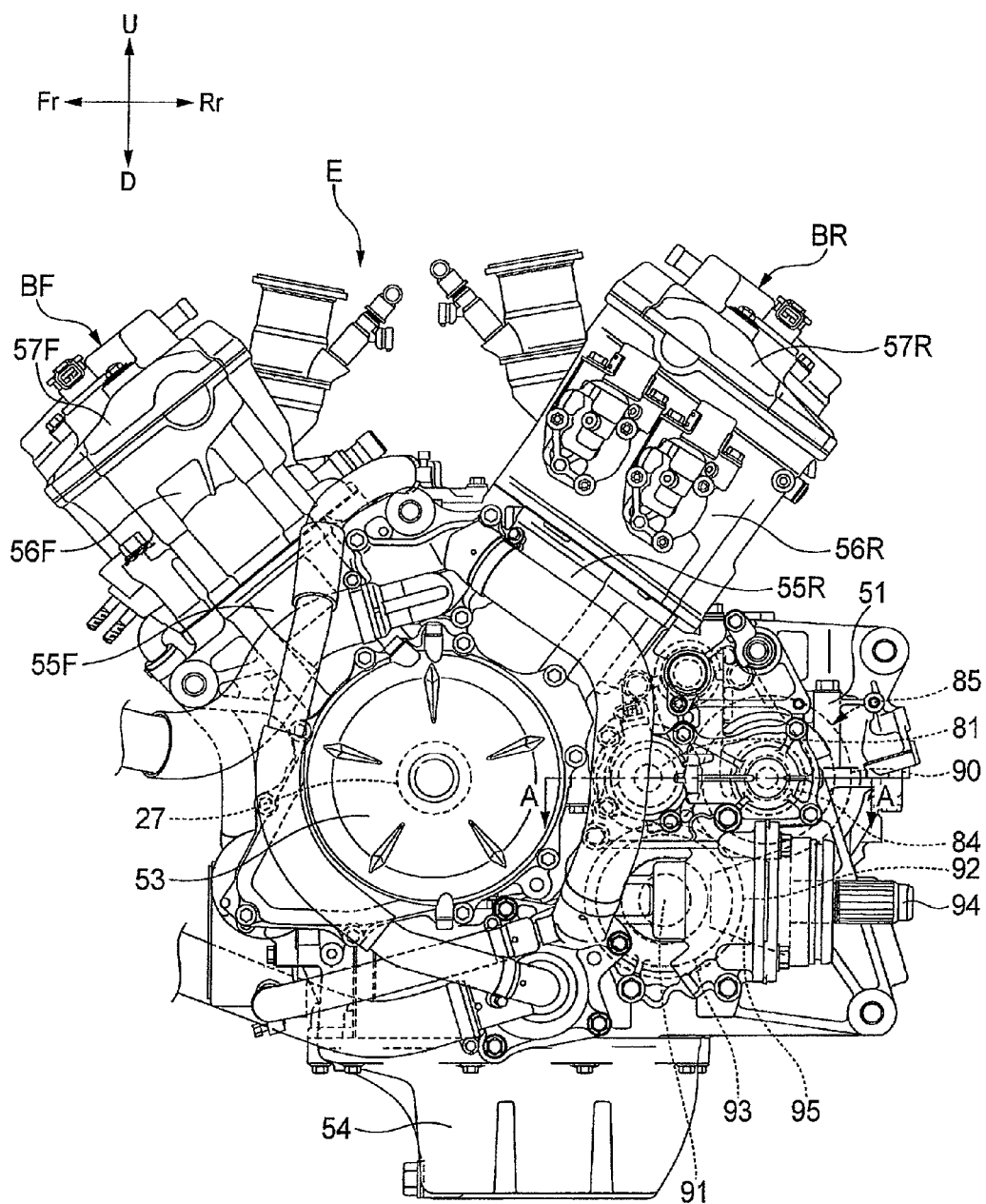
FIG. 2 is a left side view of an engine shown in FIG. 1.
Figure 3:
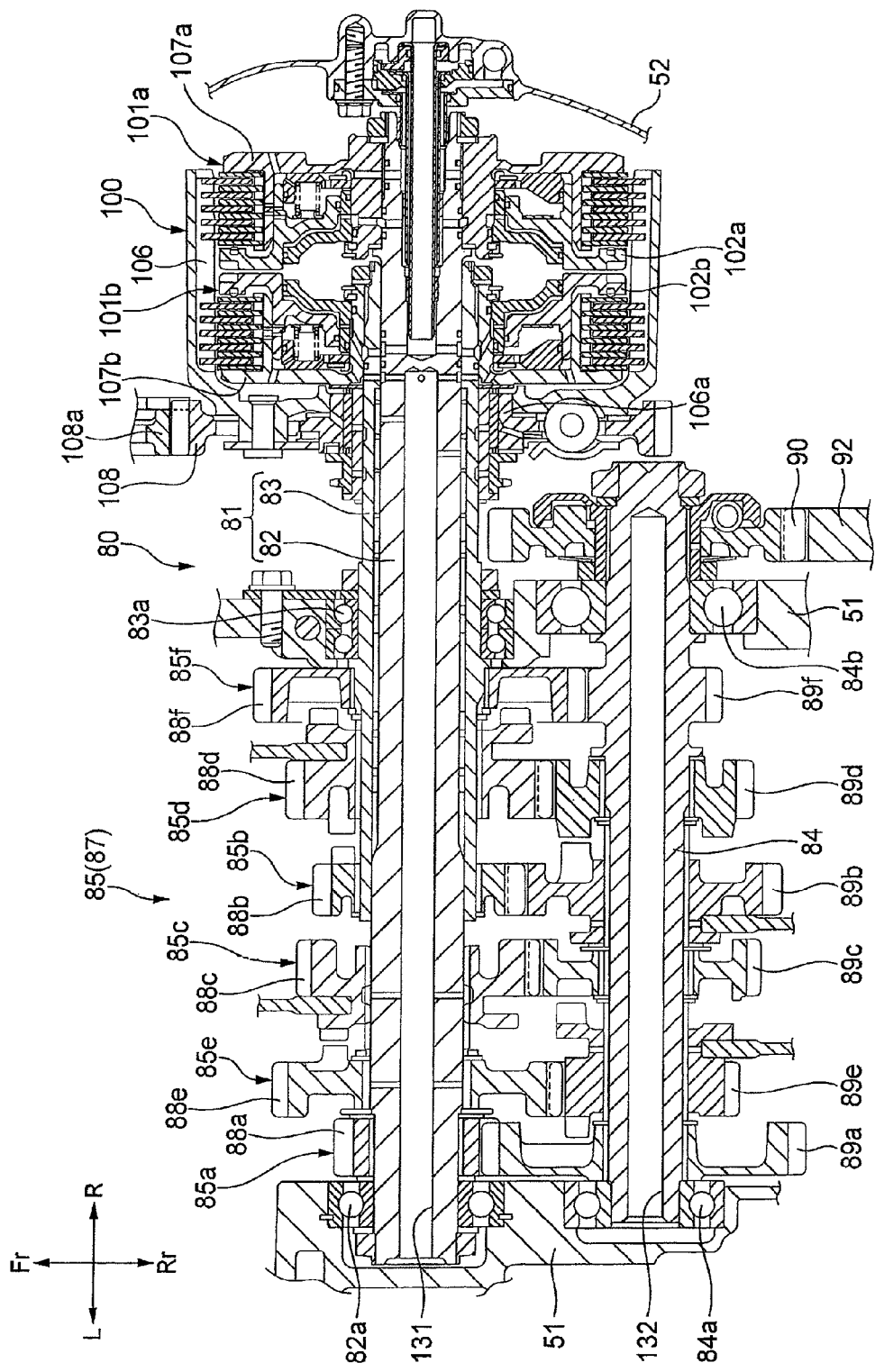
FIG. 3 is a cross-sectional view of the engine taken along a line A-A in FIG. 2.

As shown in FIG. 2 and FIG. 3, the engine E is a water-cooled V-type engine with an outer casing of the engine E being mainly constituted of a crankcase 51, a front bank BF which is mounted on a front upper portion of the crankcase 51, a rear bank BR which is arranged behind the front bank BF, a clutch cover 52 which is mounted on a right side surface of the crankcase 51, an AGC cover 53 which is mounted on a left side surface of the crankcase 51, and an oil pan 54 which is mounted on a lower surface of the crankcase 51. Further, a crankshaft 27 is rotatably supported on the crankcase 51 along the vehicle widthwise direction.

The front bank BF includes a front cylinder block 55F which is integrally formed with the crankcase 51, a front cylinder head 56F which is connected to the front cylinder block 55F, and a front head cover 57F which is connected to the front cylinder head 56F. The rear bank BR includes a rear cylinder block 55R which is integrally formed with the crankcase 51, a rear cylinder head 56R which is connected to the rear cylinder block 55R, and a rear head cover 57R which is connected to the rear cylinder head 56R.

As shown in FIG. 2 and FIG. 3, a twin-clutch-type transmission 80 is housed in a rear portion of the crankcase 51. The twin-clutch-type transmission 80 includes a main shaft 81 having the duplicate structure consisting of inner and outer shafts 82, 83; a counter shaft 84 which is arranged parallel to the main shaft 81; a group of shift gears 85 which is arranged so as to extend between the main shaft 81 and the counter shaft 84; and a twin clutch (hydraulic clutch) 100 which is coaxially arranged on a right end portion of the main shaft 81. Further, a mass which is constituted of the main shaft 81, the counter shaft 84 and the group of shift gears 85 may also be referred to as a transmission 87.

The main shaft 81 is configured such that a right end portion of the inner shaft 82 which extends between left and right portions of the crankcase 51 is inserted into the outer shaft 83 in a state wherein the inner shaft 82 is rotatable relative to the outer shaft 83. On an outer periphery of the inner shaft 82, a first-speed drive gear 88a, a third-speed drive gear 88c and a fifth-speed drive gear 88e in the group of shift gears 85 are arranged. On an outer periphery of the outer shaft 83, a second-speed drive gear 88b, a fourth-speed drive gear 88d and a sixth-speed drive gear 88f in the group of shift gears 85 are arranged. On the other hand, on an outer periphery of the counter shaft 84, first-speed to sixth-speed driven gears 89a to 89f in the group of shift gears 85 are arranged. The first-speed to sixth-speed drive gears 88a to 88f and the first-speed to sixth-speed driven gears 89a to 89f are meshed with each other at respective shift stages thus constituting first-speed to sixth-speed shift gear pairs 85a to 85f which correspond to respective shift stages.

Further, a left end portion of the inner shaft 82 is rotatably supported on the crankcase 51 by a ball bearing 82a, and an intermediate portion of the outer shaft 83 is rotatably supported on the crankcase 51 by a double row ball bearing 83a. The counter shaft 84 is rotatably supported on the crankcase 51 by ball bearings 84a, 84b.

Further, as shown in FIG. 2 and FIG. 3, an output gear 90 is mounted on a right end portion of the counter shaft 84, and a driven gear 92 which is mounted on one end portion of a final shaft 91 rotatably supported on the crankcase 51 is meshed with the output gear 90. Further, a drive bevel gear 93 is mounted on the other end portion of the final shaft 91, and a driven bevel gear 95 of an output shaft 94 connected to a front end portion of the drive shaft 26 is meshed with the drive bevel gear 93. Due to such a construction, rotational power of the counter shaft 84 is transmitted to the drive shaft 26 by way of the output gear 90, the driven gear 92, the final shaft 91, the drive bevel gear 93, the driven bevel gear 95 and the output shaft 94.

Figure 4:
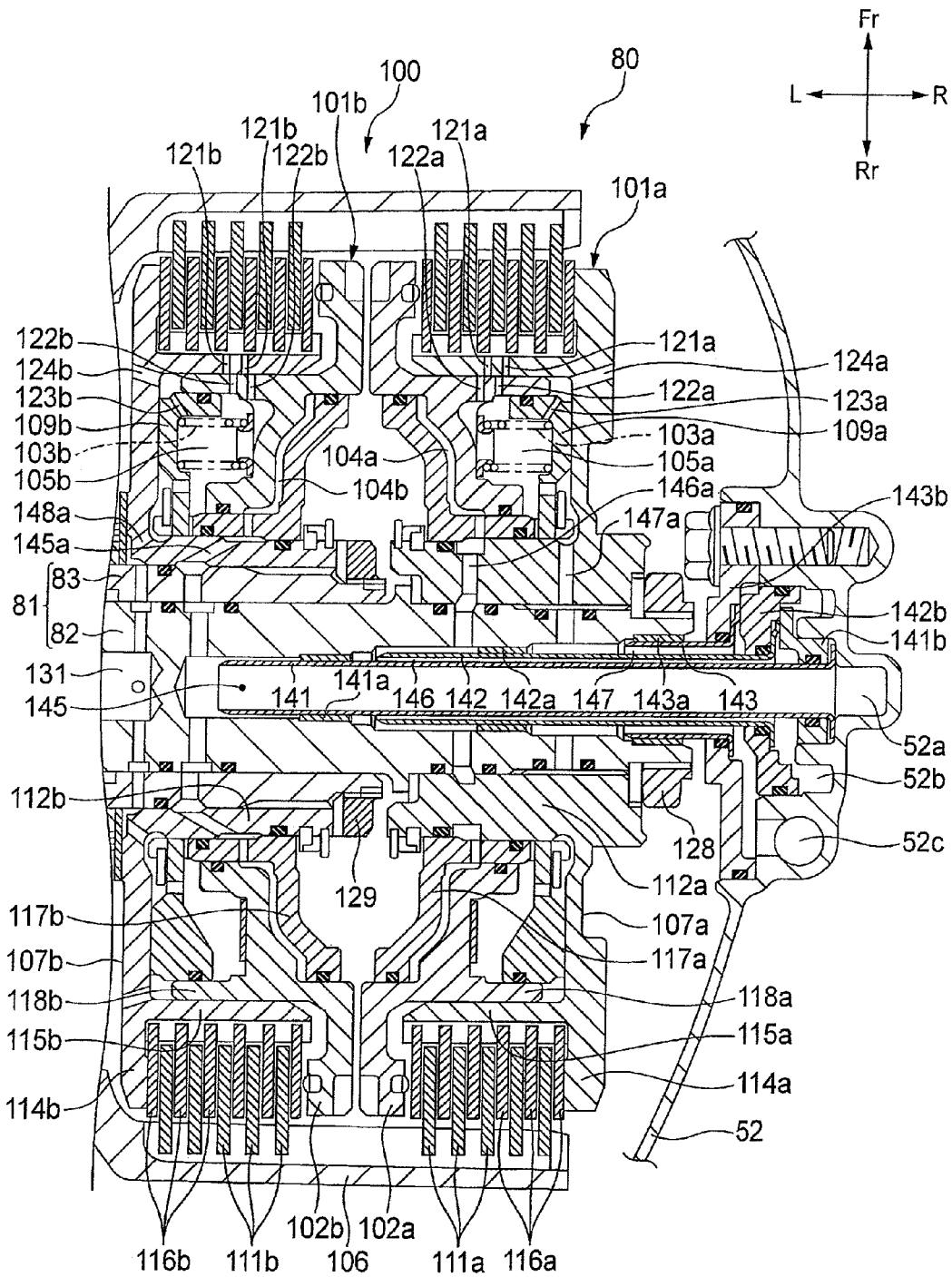
FIG. 4 is an enlarged cross-sectional view of a twin clutch shown in FIG. 3.

The twin clutch 100 includes, as shown in FIG. 3 and FIG. 4, a first clutch 101a for odd-numbered gears which is connected to a right end portion of the inner shaft 82 and is arranged on an outer side in the vehicle widthwise direction, and a second clutch 101b for even-numbered gears which is connected to a right end portion of the outer shaft 83 and is arranged on an inner side in the vehicle widthwise direction.

The first clutch 101a and the second clutch 101b are hydraulic wet multidisc clutches which are arranged coaxially and adjacent to each other.

Here, by engaging one of the first clutch 101a and the second clutch 101b and by disengaging the other of the first clutch 101a and the second clutch 101b, the transmission of power is performed using one of the shift gear pairs connected to one of the inner and outer shafts 82, 83. The shift gear pair which is used next is also preselected from the shift gear pairs connected to the other of the inner and outer shafts 82, 83, and one of the first clutch 101a and the second clutch 101b is disengaged and the other of the first clutch 101a and the second clutch 101b is engaged from such a state so that the transmission of power is switched to a mode using the preselected shift gear pair so that shift-up or the shift-down of the transmission 87 is performed.

The first and second clutches 101a, 101b exhibit a predetermined engaging force by displacing the pressure plates 102a, 102b in the axial direction in response to an oil pressure supplied from the outside. Each clutch 101a, 101b includes a return spring 103a, 103b which biases the pressure plate 102a, 102b toward a clutch disengagement side, an engagement-side oil pressure chamber 104a, 104b which applies a pushing force toward a clutch engagement side to the pressure plate 102a, 102b, and a disengagement-side oil pressure chamber (cancellation chamber) 105a, 105b which applies a pushing force toward a clutch disengagement side to the pressure plate 102a, 102b and compensates for a pressure of a return operation (cancelling an increment of the above-mentioned pushing force due to a centrifugal force of the first or second clutch 101a, 101b). Further, a relatively low oil pressure is always supplied to the disengagement-side oil pressure chambers 105a, 105b from a lubrication oil pump not shown in the drawing. Further, a relatively high oil pressure is selectively supplied to the engagement-side oil pressure chambers 104a, 104b from a clutch-use oil pump not shown in the drawing. Due to such a constitution, the first and second clutches 101a, 101b are individually engageable and disengageable to and from each other due to the presence or non-presence of the supply of oil pressure.

Further, the first and second clutches 101a, 101b share a single clutch outer 106 and have substantially the same diameter. The clutch outer 106 has a bottomed cylindrical shape which opens on a right side in the vehicle widthwise direction, wherein a clutch center 107b of the second clutch 101b is arranged on a left side of an inner portion of the clutch outer 106, and a clutch center 107a of the first clutch 101a is arranged on a right side of the inner portion of the clutch outer 106.

A primary driven gear 108 is connected to a left side of a bottom portion of the clutch outer 106 by way of a spring damper, and a primary drive gear 108a of the crankshaft 27 is meshed with the primary driven gear 108. A hub portion 106a of the clutch outer 106 is supported on an outer shaft 83 of the main shaft 81 by way of a needle bearing in a relatively rotatable manner, and is integrally rotated along with the rotation of the crankshaft 27. A plurality of clutch plates 111a for the first clutch 101a are supported in a relatively non-rotatable manner on a right side of an inner periphery of an outer wall portion of the clutch outer 106, while a plurality of clutch plates 111b for the second clutch 101b are supported in a relatively non-rotatable manner on a left side of the inner periphery of the outer wall portion of the clutch outer 106.

A center sleeve portion 112a of the clutch center 107a of the first clutch 101a is engaged with a right end portion of the inner shaft 82 which projects toward a more right side than a right end portion of the outer shaft 83 by spline fitting, and is integrally fixed to the right end portion by a lock nut 128. A right side portion of the clutch center 107a forms a flange portion 114a which spreads toward an inner periphery of an outer wall portion of the clutch outer 106. An inner wall portion (guide portion) 115a is formed in a leftwardly projecting manner on a radially intermediate portion of the flange portion 114a, and a plurality of clutch discs 116a are supported in a relatively non-rotatable manner on an outer periphery of the inner wall portion 115a. Further, the respective clutch plates 111a and the respective clutch discs 116a are arranged in an alternately overlapping manner in the clutch axial direction.

On a left side of the flange portion 114a, the pressure plate 102a is arranged to face the flange portion 114a in an opposed manner with a predetermined gap therebetween. Between an outer peripheral side of the pressure plate 102a and an outer peripheral side of the flange portion 114a, the respective clutch plates 111a and the respective clutch discs 116a are arranged in a stacked manner. Between an inner peripheral side of, the pressure plate 102a and a partition plate 109a which is arranged on a left side of the inner peripheral side of the flange portion 114a, the disengagement-side oil pressure chamber 105a is formed. Also between the inner peripheral side of the pressure plate 102a and the partition plate 109a, the return spring 103a which biases the pressure plate 102a toward a left side (toward a side where the pressure plate 102a is separated from the flange portion 114a, that is, toward a clutch disengagement side) is arranged.

On a left side of the inner peripheral side of the pressure plate 102a, a support flange portion 117a which is integrally mounted on an outer periphery of the center sleeve portion 112a is arranged so as to face the pressure plate 102a in an opposed manner. The engagement-side oil pressure chamber 104a is formed between the support flange portion 117a and the inner peripheral side of the pressure plate 102a.

On the other hand, a center sleeve portion 112b of the clutch center 107b of the second clutch 101b is engaged with a right end portion of the outer shaft 83 by spline fitting and is integrally fixed to the right end portion by a lock nut 129. A left side portion of the clutch center 107a forms a flange portion 114b which spreads toward the inner periphery of the outer wall portion of the clutch outer 106. An inner wall portion (guide portion) 115b is formed in a rightwardly projecting manner on a radially intermediate portion of the flange portion 114b, and a plurality of clutch discs 116b are supported in a relatively non-rotatable manner on an outer periphery of the inner wall portion 115b. The respective clutch plates 111b and the respective clutch discs 116b are arranged in an alternately overlapping manner in the clutch axial direction.

On a right side of the flange portion 114b, the pressure plate 102b is arranged to face the flange portion 114b in an opposed manner with a predetermined gap therebetween. Between an outer peripheral side of the pressure plate 102b and an outer peripheral side of the flange portion 114b, the respective clutch plates 111b and the respective clutch discs 116b are arranged in a stacked manner. Between an inner peripheral side of the pressure plate 102b and a partition plate 109b which is arranged on a right side of the inner peripheral side of the flange portion 114b, the disengagement-side oil pressure chamber 105b is formed. Also between the inner peripheral side of the pressure plate 102b and the partition plate 109b, the return spring 103b which biases the pressure plate 102b toward a right side (toward a side where the pressure plate 102b is separated from the flange portion 114b, that is, toward a clutch disengagement side) is arranged.

On a right side of the inner peripheral side of the pressure plate 102b, a support flange portion 117b which is integrally mounted on an outer periphery of the center sleeve portion 112b is arranged so as to face the pressure plate 102b in an opposed manner. The engagement-side oil pressure chamber 104b is formed between the support flange portion 117b and the inner peripheral side of the pressure plate 102b.

In an engine stopped state (in an oil pump stopped state), the first and second clutches 101a, 101b are brought into a clutch disengagement state where the pressure plate 102a is displaced toward a left side and the pressure plate 102b is displaced toward a right side due to biasing forces of the respective return springs 103a, 103b thus releasing the friction engagement between the respective clutch plates 111a, 111b and the respective clutch discs 116a, 116b. Further, even in an engine operated state, in a state where the supply of oil pressure is stopped, the biasing forces of the return springs 103a, 103b and oil pressure in the respective disengagement-side oil pressure chambers 105a, 105b act on the pressure plates 102a, 102b so that the first and second clutches 101a, 101b are brought into the clutch disengagement state in the same manner as described above.

On the other hand, in an engine operated state and in a state where an oil pressure is supplied to the engagement-side oil pressure chamber 104a, the first clutch 101a is brought into a clutch engagement state where the pressure plate 102a is displaced toward a right side (a flange portion 114a side, a clutch engagement side) against an oil pressure in the disengagement-side oil pressure chamber 105a and a biasing force of the return spring 103a so that the respective clutch plates 111a and the respective clutch discs 116a are sandwiched between the pressure plate 102a and the clutch center 107a with pressure. Thus, the respective clutch plates 111a and the respective clutch discs 116a are brought into friction engagement whereby a torque can be transmitted between the clutch outer 106 and the clutch center 107a.

In the same manner, in an engine operated state and in a state where an oil pressure is supplied to the engagement-side oil pressure chamber 104b, the second clutch 101b is brought into a clutch engagement state where the pressure plate 102b is displaced toward a left side (a flange portion 114b side, a clutch engagement side) against an oil pressure in the disengagement-side oil pressure chamber 105b and a biasing force of the return spring 103b so that the respective clutch plates 111b and the respective clutch discs 116b are sandwiched between the pressure plate 102b and the clutch center 107b with pressure. Thus, the respective clutch plates 111b and the respective clutch discs 116b are brought into friction engagement whereby a torque can be transmitted between the clutch outer 106 and the clutch center 107b.

When the supply of oil pressure to the engagement-side oil pressure chambers 104a, 104b is stopped, from the clutch engagement state, the first and second clutches 101a, 101b are brought into a clutch disengagement state where the pressure plate 102a is displaced toward a left side and the pressure plate 102b is displaced toward a right side due to the oil pressures in the disengagement-side oil pressure chambers 105a, 105b and the biasing forces of the return springs 103a, 103b so that the friction engagement between the respective clutch plates 111a, 111b and the respective clutch discs 116a, 116b is released whereby a torque cannot be transmitted between the clutch outer 106 and the clutch centers 107a, 107b. As described above, by using oil pressure in the disengagement-side oil pressure chambers 105a, 105b in addition to the biasing forces of the return springs 103a, 103b, even when an oil pressure generated by a centrifugal force remains in the inside of the engagement-side oil pressure chambers 104a, 104b, the pressure plates 102a, 102b can be surely displaced.

Further, in this embodiment, as shown in FIG. 4, a working oil which is supplied to the disengagement-side oil pressure chamber 105a of the first clutch 101a is introduced to the outside of the disengagement-side oil pressure chamber 105a by way of oil supply holes 121a, 122a which are formed in a portion of the inner wall portion 115a of the clutch center 107a and a portion of an outer wall portion 118a of the pressure plate 102a slidably fitted in the inner peripheral surface of the inner wall portion 115a which overlap with each other respectively, and is supplied to the respective clutch plates 111a and the respective clutch discs 116a. Further, the working oil which is supplied to the disengagement-side oil pressure chamber 105b of the second clutch 101b is introduced to the outside of the disengagement-side oil pressure chamber 105b by way of oil supply holes 121b, 122b which are formed in a portion of the inner wall portion 115b of the clutch center 107b and a portion of an outer wall portion 118b of the pressure plate 102b slidably fitted in the inner peripheral surface of the inner wall portion 115b which overlap with each other respectively, and is supplied to the respective clutch plates 111b and the respective clutch discs 116b. Accordingly, lubrication property and cooling property of the respective clutch plates 111a, 111b and the respective clutch discs 116a, 116b when the clutch is engaged can be enhanced.

Further, as shown in FIG. 4, the oil supply holes 121a, 121b formed in the inner wall portions 115a, 115b of the clutch centers 107a, 107b are respectively opened in the disengagement-side oil pressure chambers 105a, 105b by way of the oil supply holes 122a, 122b formed in the outer wall portions 118a, 118b of the pressure plates 102a, 102b.

Figure 6:
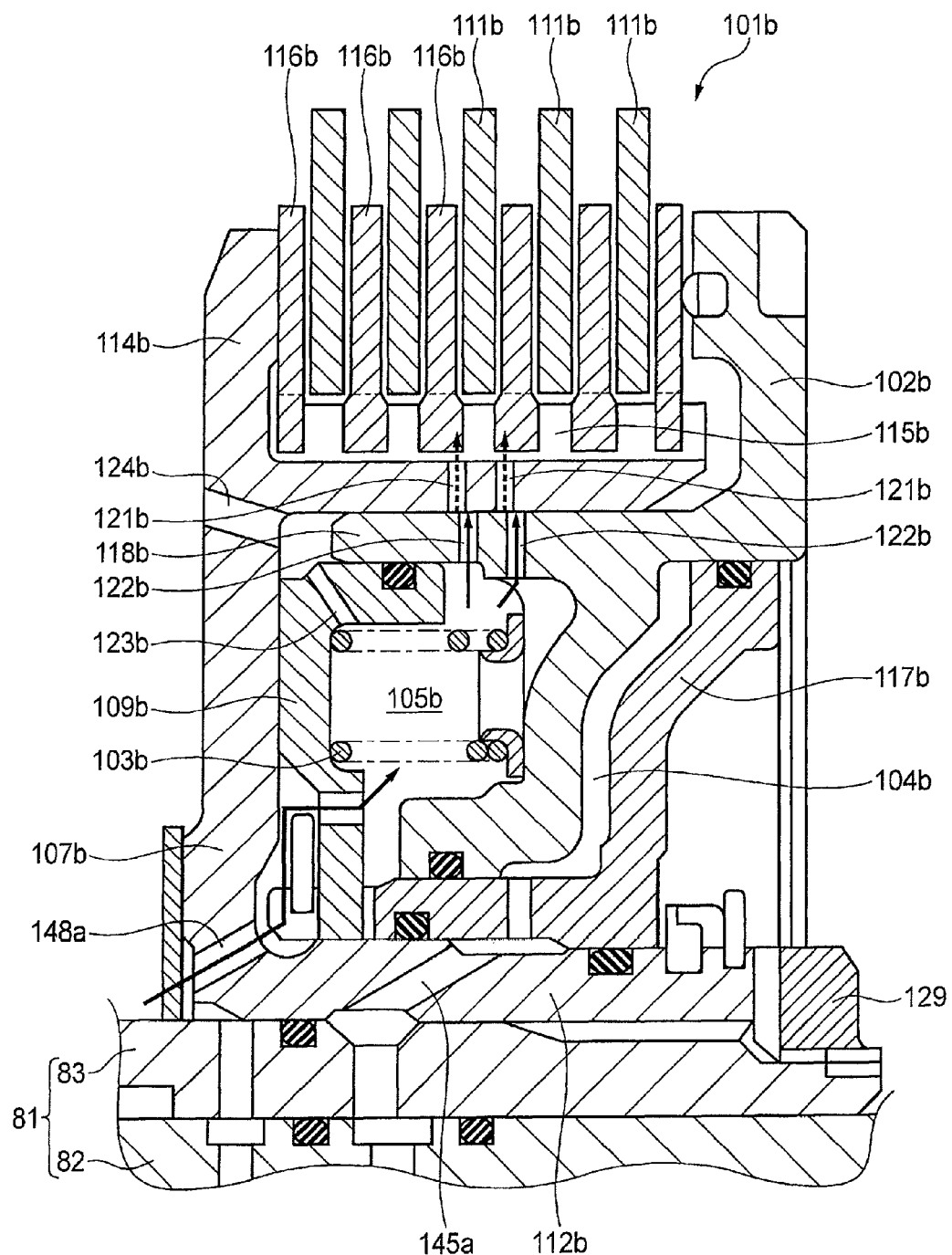
FIG. 6 is an enlarged cross-sectional view of the second clutch shown in FIG. 5 in a partial clutch engagement state.
Figure 7:
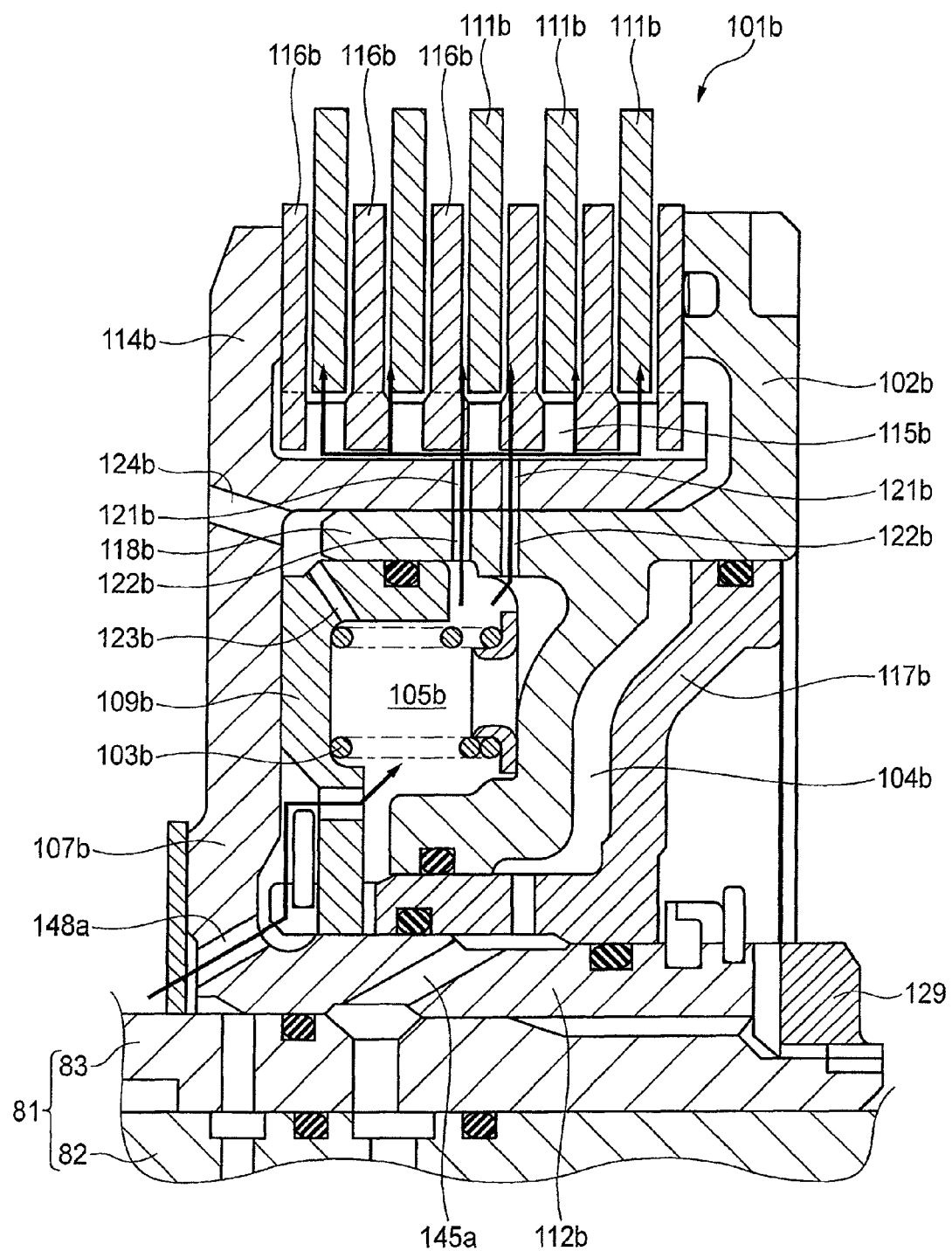
FIG. 7 is an enlarged cross-sectional view of the second clutch shown in FIG. 5 in a clutch engagement state.

Further, the oil supply hole 121b of the clutch center 107b and the oil supply hole 122b of the pressure plate 102b are arranged at positions where the oil supply holes 121b, 122b are not superposed so that the oil supply holes 121b, 122b are closed when the clutch is disengaged (see FIG. 5), the oil supply holes 121b, 122b are approximately half superposed so that the oil supply holes 121b, 122b are approximately half closed in a partial clutch engagement state (see FIG. 6), and the oil supply holes 121b, 122b are superposed at maximum so that the oil supply holes 121b, 122b are completely communicated with each other when the clutch is engaged (see FIG. 7). Due to such an arrangement, the supply of oil is stopped when the clutch is disengaged (an oil-supply quantity becomes minimum), an oil-supply quantity becomes approximately half when a clutch is partially engaged, and an oil supply quantity becomes maximum when the clutch is engaged. Although only the second clutch 101b side is shown in FIG. 5 to FIG. 7, the oil supply holes 121a, 122a on the first clutch 101a side are also arranged in the same manner as the oil supply holes 121b, 122b.

Figure 5:
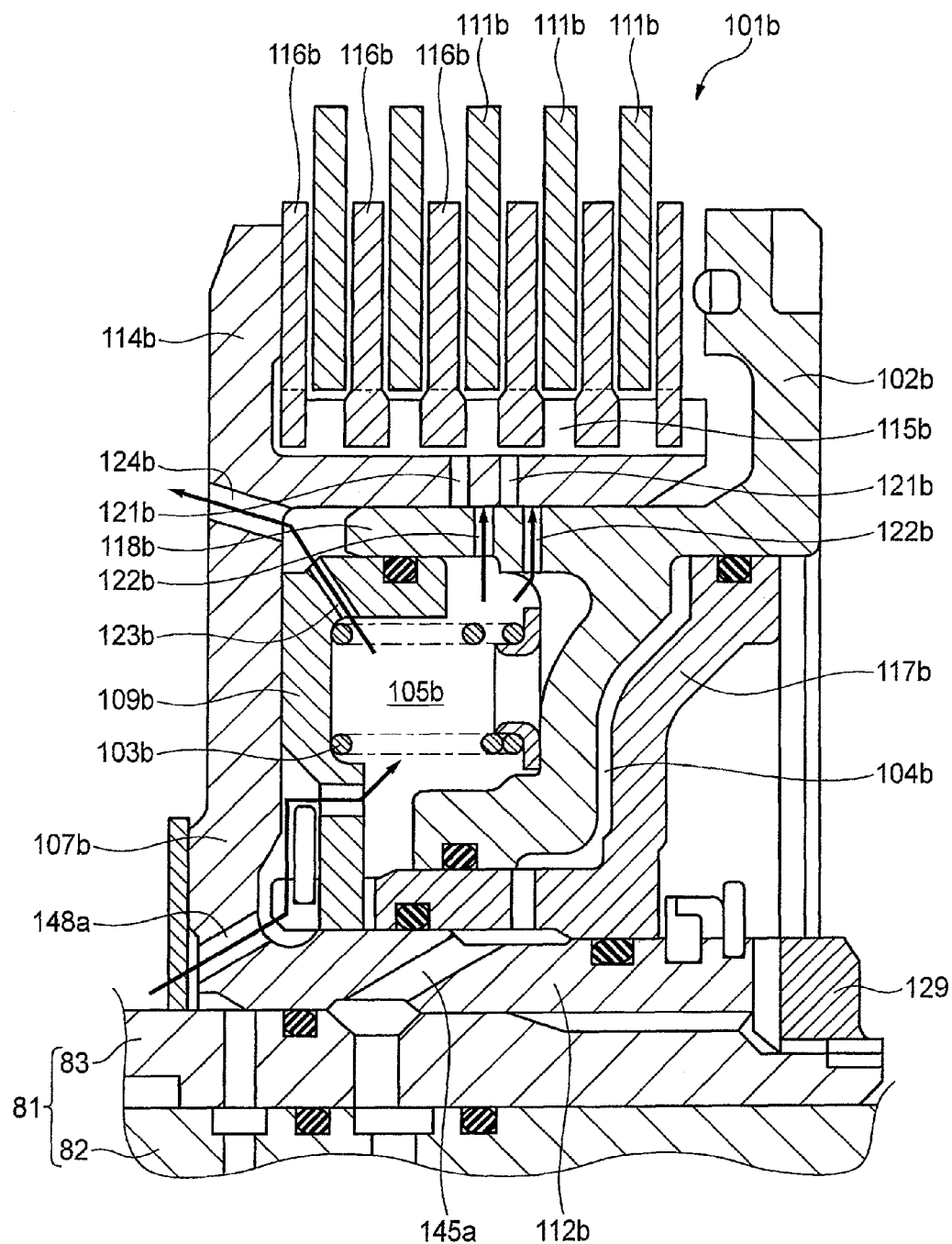
FIG. 5 is an enlarged cross-sectional view of a second clutch shown in FIG. 4 in a clutch disengagement state.

Further, as shown in FIG. 4 and FIG. 5, on an outer peripheral side of the partition plate 109a and on the flange portion 114a of the clutch center 107a, cancellation holes 123a, 124a which release an oil pressure in the disengagement-side oil pressure chamber 105a when the clutch is disengaged to the outside of the disengagement-side oil pressure chamber 105a are formed, respectively. On an outer peripheral side of the partition plate 109b and on the flange portion 114b of the clutch center 107b, cancellation holes 123b, 124b which release an oil pressure in the disengagement-side oil pressure chamber 105b when the clutch is disengaged to the outside of the disengagement-side oil pressure chamber 105b are respectively formed. Due to such a construction, it is possible to prevent the excessive elevation of an oil pressure in the disengagement-side oil pressure chambers 105a, 105b when the clutch is disengaged.

In the inside of the inner shaft 82 and the counter shaft 84 of the main shaft 81, main oil supply passages 131, 132 to which an oil pressure is supplied from the lubrication oil pump not shown in the drawing are formed respectively. Engine oil is suitably supplied to the group of shift gears 85 by way of the main oil supply passages 131, 132.

As shown in FIG. 4, in the inside of the clutch cover 52, first to third pipes 141 to 143 are arranged which extend between and over the clutch cover 52 and a right end portion of the inner shaft 82 of the main shaft 81. The first to third pipes 141 to 143 are concentrically arranged with the inner shaft 82 in a state where the pipes are arranged in an overlapping manner with predetermined gaps in the order of the first pipe 141, the second pipe 142 and the third pipe 143 from an inner peripheral side.

In the inside of a right-side portion of the inner shaft 82, a right hollow portion 144 which increases a diameter thereof rightwardly in substantially three stages is formed. The right hollow portion 144 is partitioned from the main supply oil passage 131 in the inner shaft 82 by a partition wall, and left-side portions of the first to third pipes 141 to 143 are inserted into the inside of the right hollow portion 144 from a right-end opening of the right hollow portion 144.

A left-side outer periphery of the first pipe 141 is oil-hermetically held on a left-side inner periphery of the right hollow portion 144 by way of a sealing member 141a. A left-side outer periphery of the second pipe 142 is oil-hermetically held on an intermediate-portion inner periphery of the right hollow portion 144 by way of a sealing member 142a. A left-side outer periphery of the third pipe 143 is oil-hermetically held on a right-side inner periphery of the right hollow portion 144 by way of a sealing member 143a.

Right end portions of the first to third pipes 141 to 143 are oil-hermetically inserted into and held on annular holders 141b, 142b, 143b, respectively. A flange is formed on the right end portions of the first to third pipes 141 to 143 respectively. The right end portion of the first pipe 141 is supported on the holder 141b and the clutch cover 52 with the flange sandwiched therebetween. The right end portion of the second pipe 142 is supported on the holder 141b and the holder 142b with the flange sandwiched therebetween. The right end portion of the third pipe 143 is supported on the holder 142b and the holder 143b with the flange sandwiched therebetween. The holder 143b is fixed to an inner surface of the clutch cover 52 using bolts.

A space formed in the inside of the first pipe 141 and annular spaces formed between the respective pipes 141 to 143 form first to third shaft inside oil passages 145 to 147 which are coaxially overlapped to each other in the inside of the inner shaft 82. To be more specific, the space formed in the inside of the first pipe 141 functions as the first shaft inside oil passage 145, wherein a right end portion of the first shaft inside oil passage 145 is in communication with a first supply oil passage 52a connected to a clutch center position of the clutch cover 52, and a left end portion of the first shaft inside oil passage 145 is in communication with the engagement-side oil pressure chamber 104b of the second clutch 101b by way of the inner and outer shafts 82, 83, the clutch center 107b and an engagement-side oil passage 145a formed in the support flange portion 117b. Due to such a construction, an oil pressure from the clutch-use oil pump not shown in the drawing is supplied to the first supply oil passage 52a.

The space formed between the first pipe 141 and the second pipe 142 functions as the second shaft inside oil passage 146, wherein a right end portion of the second shaft inside oil passage 146 is in communication with a cover inside the main supply oil passage 52b formed in the inside of the clutch cover 52, and a left end portion of the second shaft inside oil passage 146 is in communication with the engagement-side oil pressure chamber 104a of the first clutch 101a by way of the inner shaft 82, the clutch center 107a and an engagement-side oil passage 146a formed in the support flange portion 117a. Due to such a construction, oil pressure from the clutch-use oil pump not shown in the drawing is supplied to the cover inside main supply oil passage 52b.

The space formed between the second pipe 142 and the third pipe 143 functions as the third shaft inside oil passage 147, wherein a right end portion of the third shaft inside oil passage 147 is in communication with a second supply oil passage 52c connected to a position offset from the clutch center of the clutch cover 52, and a left end portion of the third shaft inside oil passage 147 is in communication with the disengagement-side oil pressure chamber 105a of the first clutch 101a by way of the inner shaft 82, the clutch center 107a and a disengagement-side oil passage 147a formed in the partition plate 109a. Due to such a construction, oil pressure from the lubrication-use oil pump not shown in the drawing is supplied to the second supply oil passage 52c.

A right end portion of the main supply oil passage 131 formed in the inside of the inner shaft 82 is in communication with the disengagement-side oil pressure chamber 105b of the second clutch 101b by way of the inner and outer shafts 82, 83, the clutch center 107b and a disengagement-side oil passage 148a formed in the partition plate 109b. Oil pressure from the lubrication-use oil pump not shown in the drawing is supplied to a left end portion of the main supply oil passage 131.

As has been explained heretofore, according to the twin clutch 100 of this embodiment, the superposition between the oil supply hole 122a, 122b formed in the outer wall portion 118a, 118b of the pressure plate 102a, 102b and the oil supply hole 121a, 121b formed in the inner wall portion 115a, 115b of the clutch center 107a, 107b becomes maximum when the clutch is engaged. Thus, an oil supply quantity is increased when the clutch is engaged and the oil supply quantity is decreased when the clutch is disengaged. Accordingly, a drag of the clutch can be prevented so that a change hitting sound at the time of shifting can be decreased.

Further, according to the twin clutch 100 of this embodiment, the oil supply hole 121a, 121b formed in the clutch center 107a, 107b opens in the disengagement-side oil pressure chamber 105a, 105b formed in the inside of the clutch center 107a, 107b. Thus, it is unnecessary to additionally provide an oil supply passage toward the oil supply hole 121a, 121b whereby an oil supply passage can be simplified.

Further, according to the twin clutch 100 of this embodiment, the cancellation hole 123a, 123b, 124a, 124b for releasing oil pressure in the disengagement-side oil pressure chamber 105a, 105b to the outside of the disengagement-side oil pressure chamber 105a, 105b is formed in the disengagement-side oil pressure chamber 105a, 105b in addition to the oil supply hole 121a, 121b, 122a, 122b. Thus, it is possible to prevent the excessive elevation of oil pressure in the disengagement-side oil pressure chamber 105a, 105b when the clutch is disengaged. Accordingly, an operation at the time of next clutch engagement can be carried out rapidly so that the response of the twin clutch 100 can be enhanced.

Further, according to the twin clutch 100 of this embodiment, the twin clutch 100 is used in the twin-clutch type transmission 80. Accordingly, although a change hitting sound is liable to occur when a clutch is drawn at the time of changing a state of a clutch in the twin-clutch type transmission 80, this embodiment can prevent the occurrence of such a change hitting sound.

Figure 8:
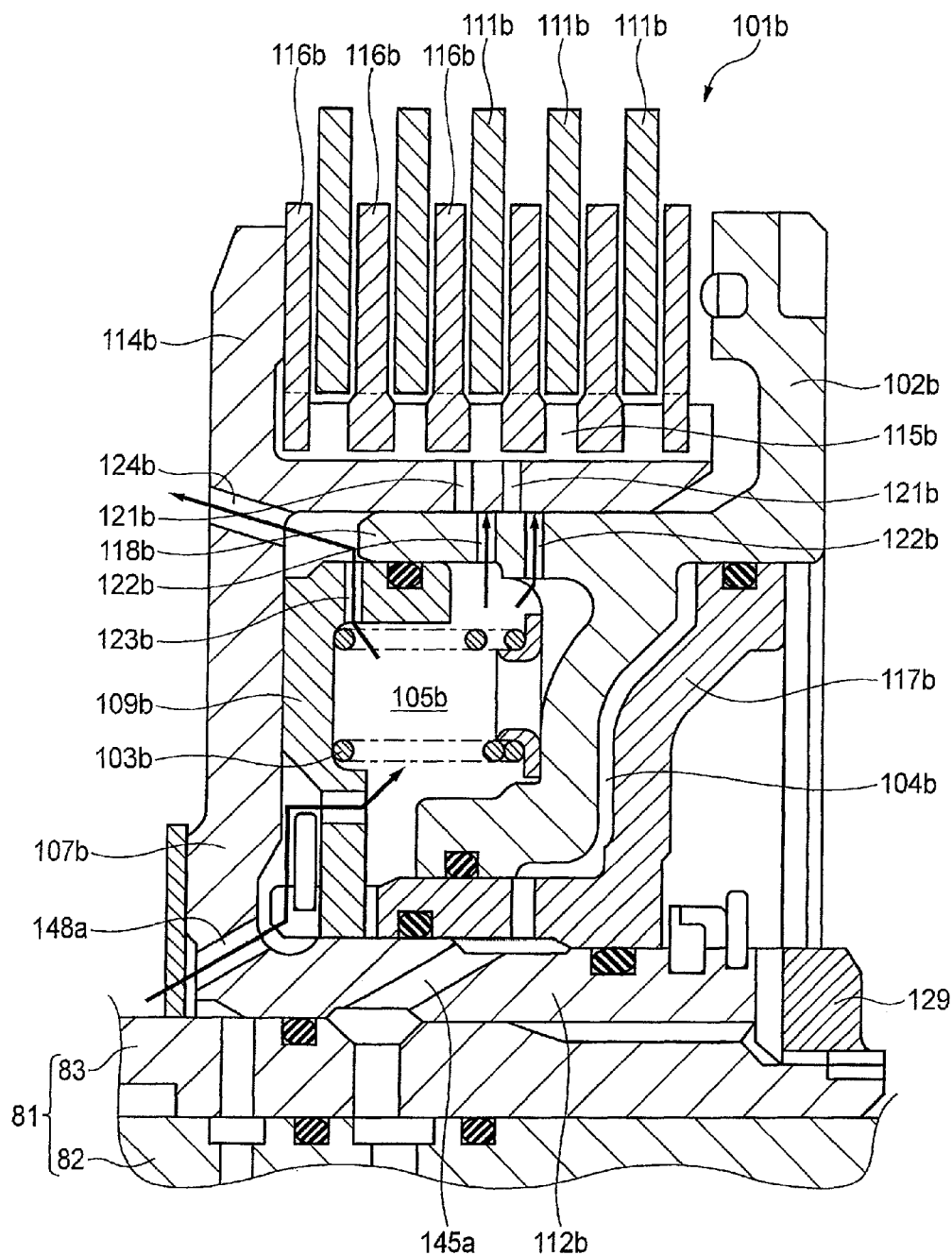
FIG. 8 is an enlarged cross-sectional view of the second clutch according to a modification of a twin clutch in a clutch disengagement state.
Figure 9:
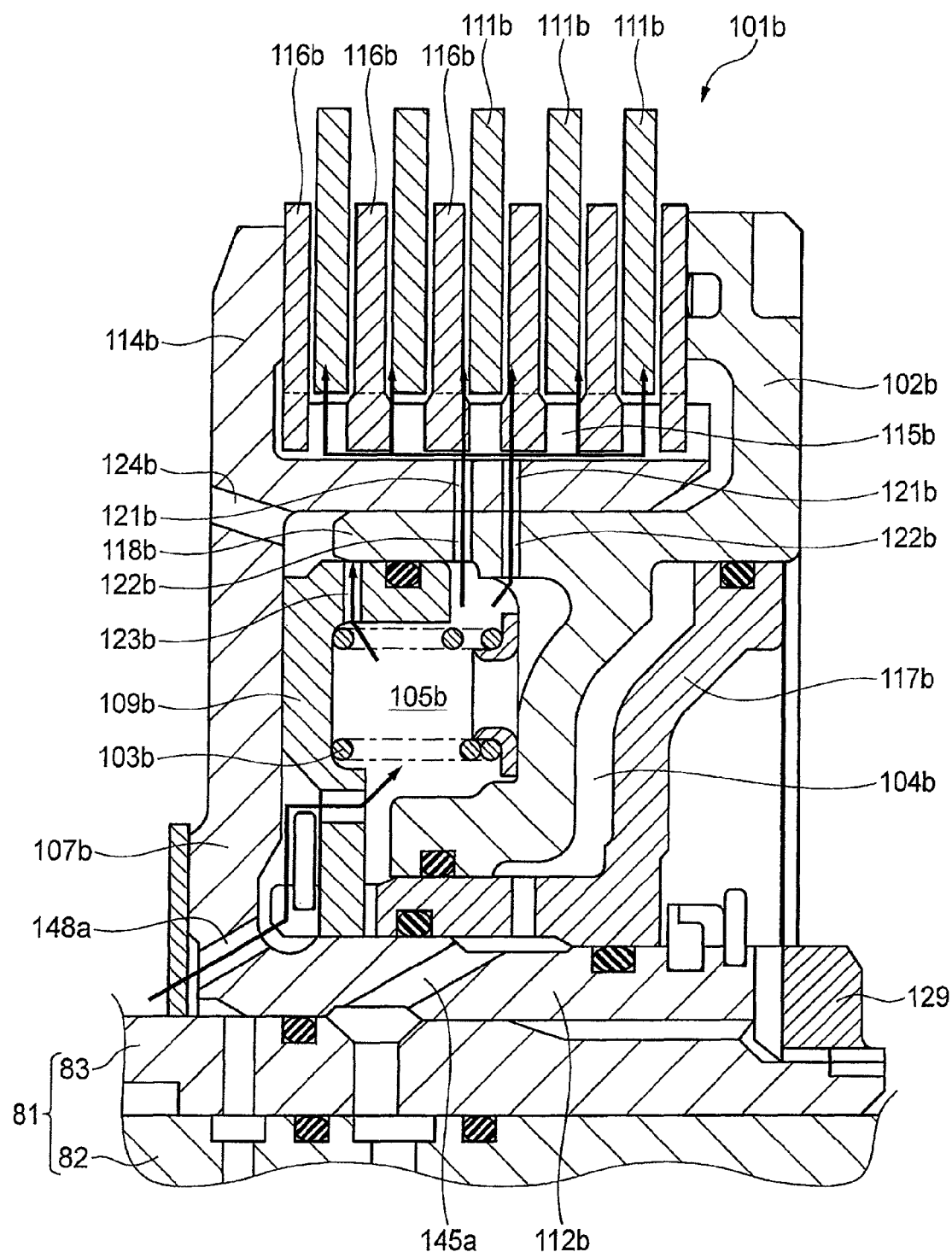
FIG. 9 is an enlarged cross-sectional view of the second clutch shown in FIG. 8 in a clutch engagement state.

As a modification of this embodiment, as shown in FIG. 8 and FIG. 9, a cancellation hole 123b formed in a partition plate 109b may be closed by an outer wall portion 118b of a pressure plate 102b when the clutch is engaged, and the cancellation hole 123b may be opened when the clutch is disengaged. To be more specific, when the pressure plate 102b is displaced to the left due to oil pressure supplied to an engagement-side oil pressure chamber 104b, the cancellation hole 123b is closed by a distal end portion of the outer wall portion 118b, while when the pressure plate 102b is displaced to the right due to oil pressure supplied to a disengagement-side oil pressure chamber 105b and a biasing force of a return spring 103b, the cancellation hole 123b is opened. Although only a second clutch 101b side is shown in FIG. 8 and FIG. 9, the substantially same structure is also applied to a first clutch 101a side.

Further, according to the modification, the cancellation hole 123a, 123b is closed by the pressure plate 102a, 102b when the clutch is engaged, and the cancellation hole 123a, 123b is opened when the clutch is disengaged. Thus, it is possible to elevate an oil pressure in the disengagement-side oil pressure chamber 105a, 105b when the clutch is engaged. Accordingly, an operation at the time of next clutch disengagement can be carried out rapidly so that the response of a twin clutch 100 can be enhanced.

The present invention is not limited to the hydraulic clutch exemplified in the above-mentioned embodiment and proper changes can be made without departing from the gist of the present invention.

For example, in the above-mentioned embodiment, the case where the present invention is applied to the twin clutch which has two clutches has been exemplified, the present invention is not limited to such a case, and the present invention may be applied to a single clutch which has one clutch.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic clutch in which a plurality of clutch discs and a plurality of clutch plates are provided between a clutch outer and a clutch center, and the engagement and disengagement of the clutch are performed by pushing the plurality of clutch discs and the plurality of clutch plates by a clutch pressure plate, comprising:
an oil supply hole formed in a portion of the clutch pressure plate and an oil supply hole formed in a portion of a guide portion of the clutch center, both of which overlap with each other, wherein said plurality of clutch discs are supported in a relatively non-rotatable manner on an outer periphery of the guide portion, and
a superposition between the oil supply hole formed in the clutch pressure plate and the oil supply hole formed in the clutch center becomes maximum when the clutch is engaged.

2. The hydraulic clutch according to claim 1, wherein the hydraulic clutch is used in a twin-clutch type transmission.

3. The hydraulic clutch according to claim 1, wherein the superposition between the oil supply hole formed in the clutch pressure plate and the oil supply hole formed in the clutch center is approximately one-half when the hydraulic clutch is partially engaged and is stopped when the hydraulic clutch is disengaged.

4. The hydraulic clutch according to claim 1, wherein the oil supply hole formed in the clutch center opens in a cancellation chamber formed in the inside of the clutch center.

5. The hydraulic clutch according to claim 4, and further including a biasing means operatively disposed within said cancellation chamber for normally biasing the clutch pressure plate to a non-engaging position.

6. The hydraulic clutch according to claim 4, wherein the hydraulic clutch is used in a twin-clutch type transmission.

7. The hydraulic clutch according to claim 4, wherein a cancellation hole for releasing an oil pressure in the cancellation chamber to the outside of the cancellation chamber is formed in the cancellation chamber in addition to the oil supply hole.

8. The hydraulic clutch according to claim 7, wherein the cancellation hole is closed by the clutch pressure plate when the clutch is engaged, and the cancellation hole is opened when the clutch is disengaged.

9. The hydraulic clutch according to claim 8, wherein the hydraulic clutch is used in a twin-clutch type transmission.

10. The hydraulic clutch according to claim 7, wherein the hydraulic clutch is used in a twin-clutch type transmission.

11. A hydraulic clutch comprising:
a plurality of clutch discs;
a plurality of clutch plates;
a clutch outer and a clutch center, said plurality of clutch discs and said plurality of clutch plates being operatively mounted between said clutch outer and said clutch center, said clutch center including a guide portion, said clutch pressure plate and said guide portion overlapping relative to each other, wherein said plurality of clutch discs are supported in a relatively non-rotatable manner on an outer periphery of the guide portion;
a clutch pressure plate, said plurality of clutch discs and said plurality of clutch plates being brought into engagement and disengagement by pushing the plurality of clutch discs and the plurality of clutch plates by said clutch pressure plate; and
an oil supply hole formed in a portion of the clutch pressure plate and an oil supply hole formed in a portion of said guide portion of the clutch center, both of which overlap with each other;
wherein when said hydraulic clutch is engaged, a superposition between the oil supply hole formed in the clutch pressure plate and the oil supply hole formed in the guide portion of the clutch center becomes a maximum.

12. The hydraulic clutch according to claim 11, wherein the hydraulic clutch is used in a twin-clutch type transmission.

13. The hydraulic clutch according to claim 11, wherein the superposition between the oil supply hole formed in the clutch pressure plate and the oil supply hole formed in the guide portion of the clutch center is approximately one-half when the hydraulic clutch is partially engaged and is stopped when the hydraulic clutch is disengaged.

14. The hydraulic clutch according to claim 11, wherein the oil supply hole formed in the guide portion of the clutch center opens in a cancellation chamber formed in the inside of the clutch center.

15. The hydraulic clutch according to claim 14, and further including a biasing means operatively disposed within said cancellation chamber for normally biasing the clutch pressure plate to a non-engaging position.

16. The hydraulic clutch according to claim 14, wherein the hydraulic clutch is used in a twin-clutch type transmission.

17. The hydraulic clutch according to claim 14, wherein a cancellation hole for releasing an oil pressure in the cancellation chamber to the outside of the cancellation chamber is formed in the cancellation chamber in addition to the oil supply hole.

18. The hydraulic clutch according to claim 17, wherein the hydraulic clutch is used in a twin-clutch type transmission.

19. The hydraulic clutch according to claim 17, wherein the cancellation hole is closed by the clutch pressure plate when the clutch is engaged, and the cancellation hole is opened when the clutch is disengaged.

20. The hydraulic clutch according to claim 19, wherein the hydraulic clutch is used in a twin-clutch type transmission.

* * * * *